US012694035B2

(12) United States Patent
Singh et al.

(10) Patent No.: US 12,694,035 B2
(45) Date of Patent: Jul. 28, 2026

(54) METHOD AND SYSTEM FOR PRIORITIZING TRANSLATION REQUESTS

(71) Applicant: Honeywell International Inc., Charlotte, NC (US)

(72) Inventors: Ankit Singh, Apex, NC (US); Shashidhar Kotta, Plainsboro, NJ (US); Md Danish Imam, Plainsboro, NJ (US); Pratik Sampatrao Patil, Plainsboro, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/885,785

(22) Filed: Sep. 16, 2024

(65) Prior Publication Data

US 2026/0079947 A1     Mar. 19, 2026

(51) Int. Cl.
| | |
|---|---|
| *G06F 17/00* | (2019.01) |
| *G06F 7/00* | (2006.01) |
| *G06F 16/2457* | (2019.01) |

(52) U.S. Cl.
CPC .............................. *G06F 16/24578* (2019.01)

(58) Field of Classification Search
CPC ................................................ G06F 16/24578
USPC ......................................................... 707/730
See application file for complete search history.

(56) References Cited

U.S. PATENT DOCUMENTS

| | | | | |
|---|---|---|---|---|
| 7,110,938 | B1 * | 9/2006 | Cheng ..................... | G06F 40/44 704/7 |
| 9,304,990 | B2 * | 4/2016 | Bank ....................... | G06F 40/58 |
| 11,348,680 | B2 * | 5/2022 | Kartoun ................. | G16H 40/20 |
| 2007/0294076 | A1 * | 12/2007 | Shore ...................... | G06F 40/47 704/2 |
| 2012/0016655 | A1 * | 1/2012 | Travieso ............... | G06F 16/972 704/2 |
| 2015/0371341 | A1 * | 12/2015 | Iyer ........................ | G06Q 10/40 705/319 |
| 2016/0019205 | A1 * | 1/2016 | Kidwai ................... | G06F 40/47 704/7 |
| 2017/0083845 | A1 * | 3/2017 | Karcher ........... | G06Q 10/06313 |
| 2017/0192963 | A1 * | 7/2017 | Ni ........................... | G06F 40/58 |
| 2020/0012653 | A1 * | 1/2020 | Mehta ............... | G06F 16/24578 |
| 2020/0388378 | A1 * | 12/2020 | Kartoun ................. | G16H 40/20 |

(Continued)

*Primary Examiner* — Pavan Mamillapalli
(74) *Attorney, Agent, or Firm* — ALSTON & BIRD LLP

(57)     ABSTRACT

The present disclosure provides a method and system for prioritizing translation requests in a translation service system. The method comprises receiving the one or more translation requests from the one or more users. The method further comprises extracting one or more attributes associated with the one or more translation requests, wherein the one or more attributes include at least one of: contextual information, frequency, size and language configuration of the one or more translation requests. The method further comprises assigning a weight to each attribute of the one or more translation requests. The method further comprises calculating a weighted score for the one or more translation requests based on the assigned weight to each attribute of the one or more attributes and ranking the one or more translation requests based on the weighted score. The method further comprises transmitting the one or more translation requests based on the rank to a data translation engine for translation. A system for prioritizing translation requests is also disclosed.

18 Claims, 9 Drawing Sheets

(56)　　　　　　References Cited

U.S. PATENT DOCUMENTS

| | | | |
|---|---|---|---|
| 2020/0401565 A1* | 12/2020 | Saillet | G06F 16/24578 |
| 2023/0196477 A1* | 6/2023 | Bassi | G06Q 10/40 |
| | | | 705/319 |

* cited by examiner

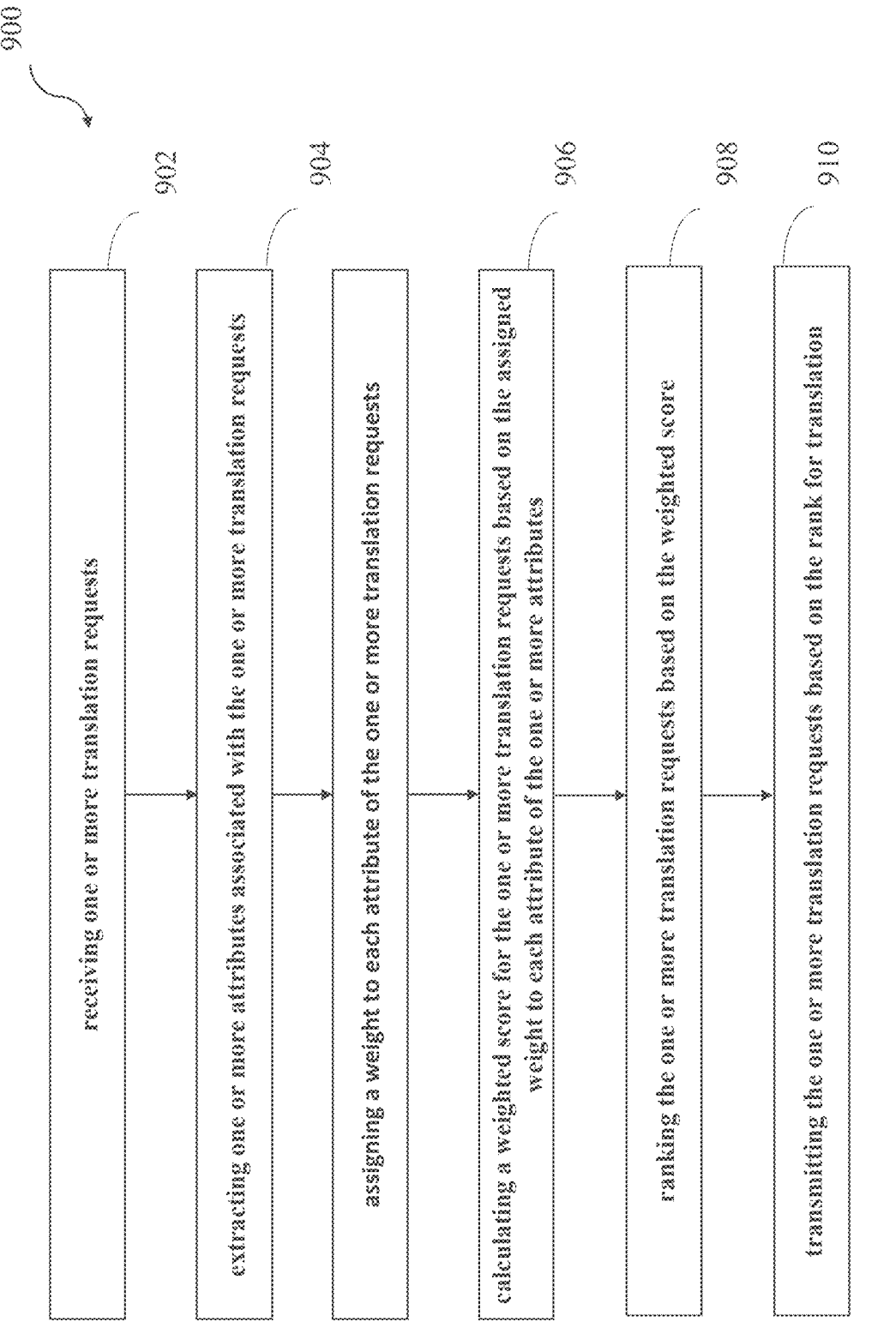

900

902 receiving one or more translation requests 904 extracting one or more attributes associated with the one or more translation requests assigning a weight to each attribute of the one or more translation requests 906 calculating a weighted score for the one or more translation requests based on the assigned weight to each attribute of the one or more attributes 908 ranking the one or more translation requests based on the weighted score 910 transmitting the one or more translation requests based on the rank for translation

Fig. 9

METHOD AND SYSTEM FOR PRIORITIZING TRANSLATION REQUESTS

TECHNICAL FIELD

Embodiments of the present disclosure generally relate to translation service system. Particularly, the present disclosure relates to a method and system for prioritizing translation requests in a translation service system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Typically, business enterprises implement various business processes for collecting and managing data and information required for the particular enterprise. As business enterprises conduct operations globally, data translation engines are important for enterprises, especially when they need to integrate and harmonize data from diverse sources. However, managing large volumes of data creates operational challenges which affects the efficiency of the translation services.

Even though, the conventional translation systems are scalable machine translation service, they do have some drawbacks when handling large volumes of data. In the conventional arts, as data volume increases, the costs associated with translation services increases. Further, as the volume of data keeps fluctuating, scaling the infrastructure presents drawback and challenges, thereby predicting costs accurately for large-scale translation projects can be difficult. Handling large volume of data also has other limitations related to translation quality, management complexity, performance, data integrity and consistency, customization, etc.

Accordingly, there is a need for technical solutions to address the technical problems discussed above, and other inefficiencies of the prior arts. Particularly, there is a need for a translation service system and associated method thereof in business enterprises that may streamline the translation process and optimize overall efficiency.

The legacy approaches fail to provide efficient techniques for managing translation requests, that not only enhances the operational efficiency of the translation service system but also provides enhanced performance and improved accuracy.

Applicant has identified many technical challenges and difficulties associated with current solutions and through applied effort, ingenuity, and innovation, the applicant has provided a solution to the above-mentioned drawbacks.

SUMMARY OF THE INVENTION

In general, embodiments of the present disclosure relate to prioritizing translation requests in a translation service system. Other implementations will be, or will become, apparent to one with skill in the art upon examination of the following figures and detailed description. It is intended that all such additional implementations be included within this description be within the scope of the disclosure and be protected within the scope of the following claims.

The present disclosure provides techniques for prioritizing translation requests in a translation service system based on one or more attributes associated with each translation request. In an embodiment, techniques are provided for ranking the translation requests based on the attributes of the translation requests. In an embodiment, the one or more attributes associated with the one or more translation requests may include at least one of: contextual information, frequency, size and language configuration of the requests. The weights of the one or more attributes of the translation requests reflect the relative importance of the attributes based on which the translation requests are to be prioritized. The present disclosure provides a ranking system wherein the plurality of the translation requests received from the one or more users are prioritized based on the one or more attributes of the requests. The disclosure provides a custom solution for translation service considering the attributes of the requests. The advantage of having a custom solution is to provide the fastest, lowest cost solution based on the expected rate of translation and expected size of translation. The solution proposed by the present disclosure provides a technique wherein, instead of automatically submitting the request for translation or queuing the translation request, the requests for translation are sent to the data translation engine by employing a scenario calculator, which is dynamic and prioritizes the translation requests before sending to the data translation engine.

In one embodiment, the present disclosure provides a system for prioritizing one or more translation requests based on one or more attributes associated with each translation request, the system comprising a processor and a memory storing program instructions which, when executed by the processor, causes the processor to receive the one or more translation requests from the one or more users. The processor is configured to extract one or more attributes associated with the one or more translation requests, wherein the one or more attributes include at least one of: contextual information, frequency, size and language configuration of the one or more translation requests. The processor is further configured to extract the contextual information from the one or more translation requests, wherein the contextual information comprises at least one of: a purpose, a category and an urgency of the one or more translation requests. The processor is further configured to determine the frequency of the one or more translation requests and may calculate a load factor based on the frequency of the one or more translation requests. The processor is further configured to determine, based on the size of the one or more translation requests, whether to send a single translation request separated by delimiters or send multiple translation requests through a queue. The processor is further configured to send the one or more translation requests as a giant string for translation and parse the translated string to replace a source language with a target language, if the size of the one or more translation requests is below a pre-defined threshold. The processor is further configured to send the one or more translation requests through the queue, if the size of the one or more translation requests exceeds the pre-defined threshold. The processor is further configured to identify the target language and number of bytes per translation for the one or more translation requests. The processor is further configured to assign a weight to each attribute of the one or more translation requests and calculate a weighted score for the one or more translation requests based on the assigned weight to each attribute of the one or more attributes. The processor is further configured to rank the one or more translation requests based on the weighted score, and transmit the one or more translation requests based on the rank to a data translation engine for translation.

In another embodiment, the present disclosure provides a method for prioritizing translation requests in a translation service system based on one or more attributes associated with each translation request. The method comprises receiving the one or more translation requests from the one or more users. The method further comprises extracting one or more attributes associated with the one or more translation requests, wherein the one or more attributes include at least one of: contextual information, frequency, size and language configuration of the one or more translation requests. The method further comprises extracting the contextual information from the one or more translation requests, wherein the contextual information comprises at least one of: a purpose, a category and an urgency of the one or more translation requests. The method further comprises determining the frequency of the one or more translation requests and calculating a load factor based on the frequency of the one or more translation requests. The method further comprises determining, based on the size of the one or more translation requests, whether to send a single translation request separated by delimiters or send multiple translation requests through a queue. The method further comprises sending the one or more translation requests as a giant string for translation and parsing the translated string to replace a source language with a target language, if the size of the one or more translation requests is below a pre-defined threshold. The method further comprises sending the one or more translation requests through the queue, if the size of the one or more translation requests exceeds the pre-defined threshold. The method further comprises identifying a target language and number of bytes per translation for at least one of the one or more translation requests. The method further comprises assigning a weight to each attribute of the one or more translation requests. The method further comprises calculating a weighted score for the one or more translation requests based on the assigned weight to each attribute of the one or more attributes and ranking the one or more translation requests based on the weighted score. The method further comprises transmitting the one or more translation requests based on the rank to a data translation engine for translation.

In yet another embodiment, the present disclosure provides a non-transitory computer-readable storage medium, storing program instructions executed by a processor for prioritizing translation requests in a translation service system based on one or more attributes associated with each translation request. The program instructions when executed by the processor, receives one or more translation requests from the one or more users. The program instructions when executed by the processor, extracts one or more attributes associated with the one or more translation requests, wherein the one or more attributes include at least one of: contextual information, frequency, size and language configuration of the one or more translation requests. The program instructions when executed by the processor, extracts the contextual information from the one or more translation requests, wherein the contextual information comprises at least one of: a purpose, a category and an urgency of the one or more translation requests. The program instructions when executed by the processor, determines the frequency of the one or more translation requests and calculates a load factor based on the frequency of the one or more translation requests. The program instructions when executed by the processor, determines, based on the size of the one or more translation requests, whether to send a single translation request separated by delimiters or send multiple translation requests through a queue. The program instructions when executed by the processor, sends the one or more translation requests as a giant string for translation and parses the translated string to replace a source language with a target language, if the size of the one or more translation requests is below a pre-defined threshold. The program instructions when executed by the processor, sends the one or more translation requests through the queue, if the size of the one or more translation requests exceeds the pre-defined threshold. The program instructions when executed by the processor, identifies a target language and number of bytes per translation for at least one of the one or more translation requests. The program instructions when executed by the processor, assigns a weight to each attribute of the one or more translation requests. The program instructions executed by the processor, calculates a weighted score for the one or more translation requests based on the assigned weight to each attribute of the one or more attributes. The program instructions when executed by the processor, ranks the one or more translation requests based on the weighted score. The program instructions when executed by the processor, transmits the one or more translation requests based on the rank to a data translation engine for translation.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
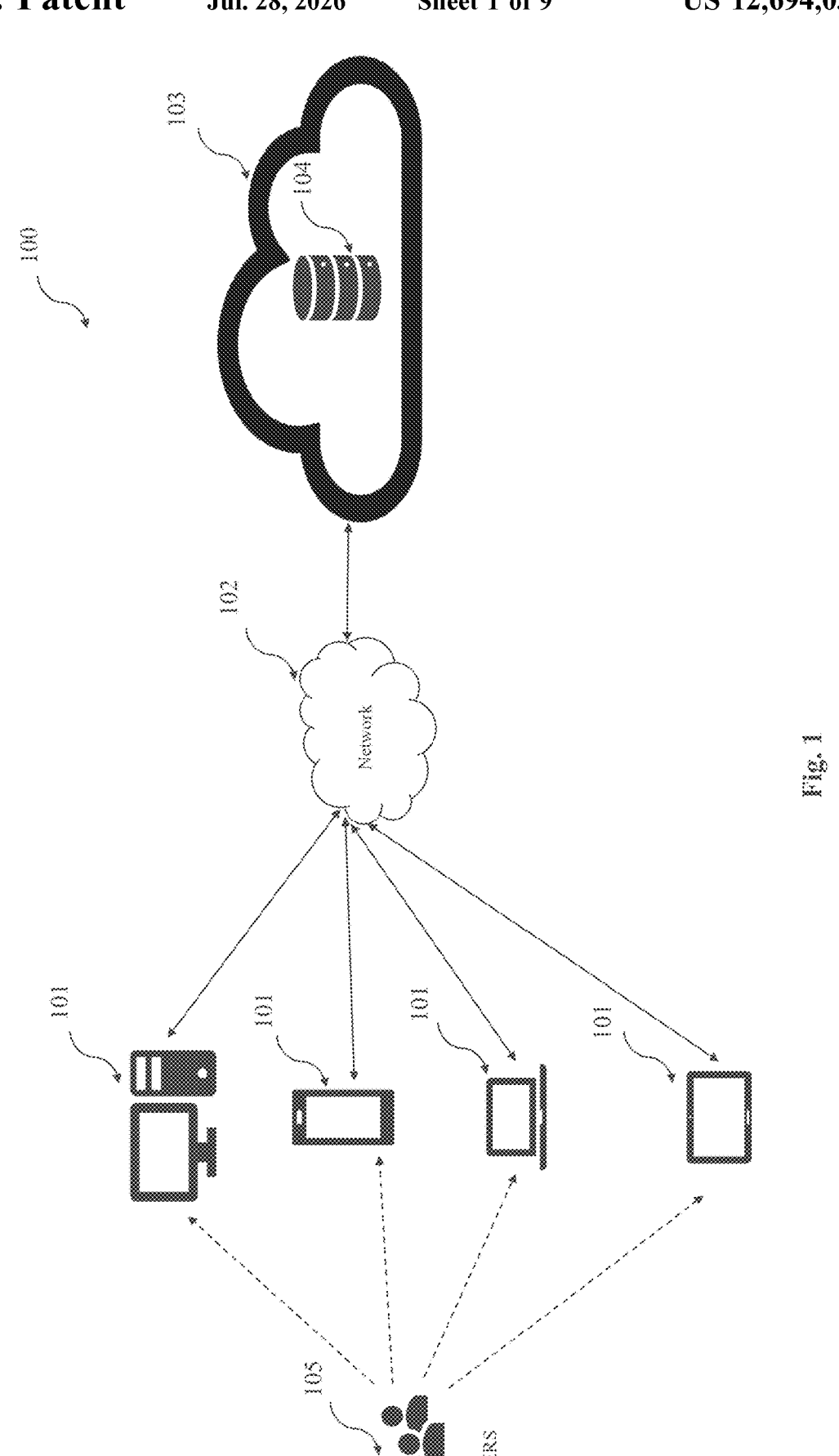
Figure 2:
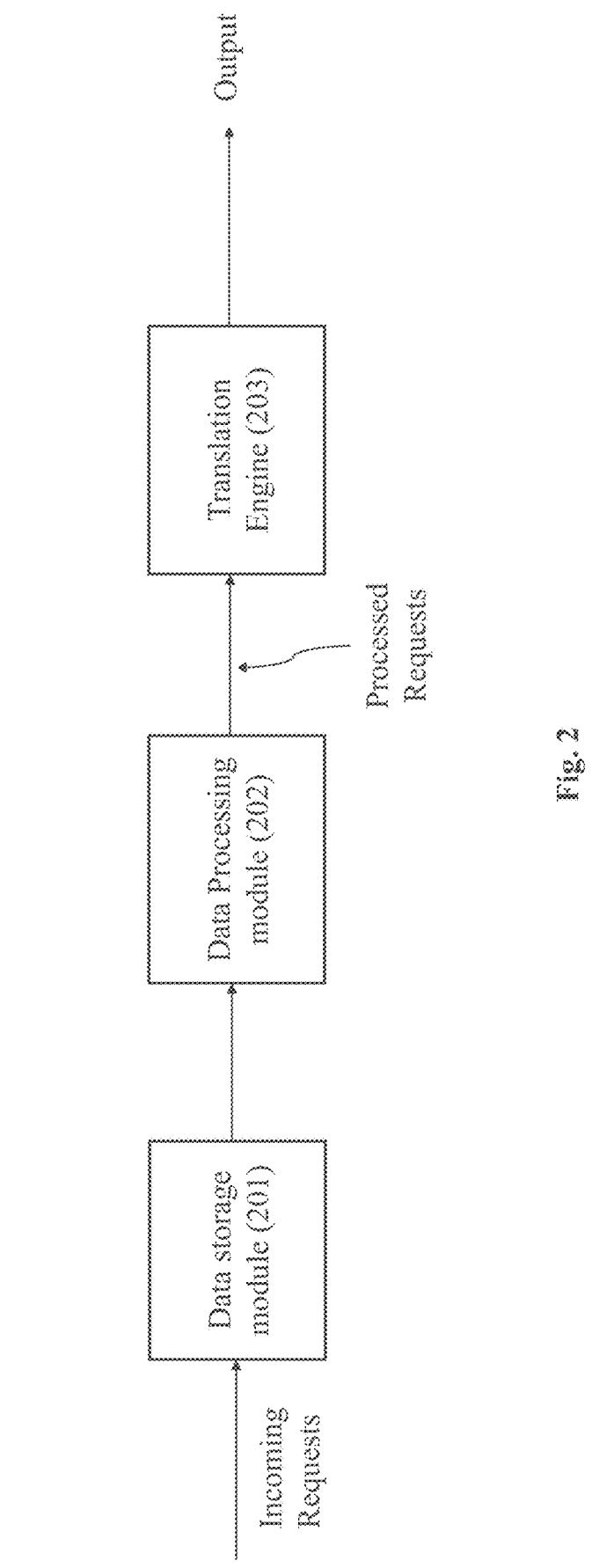
Figure 3:
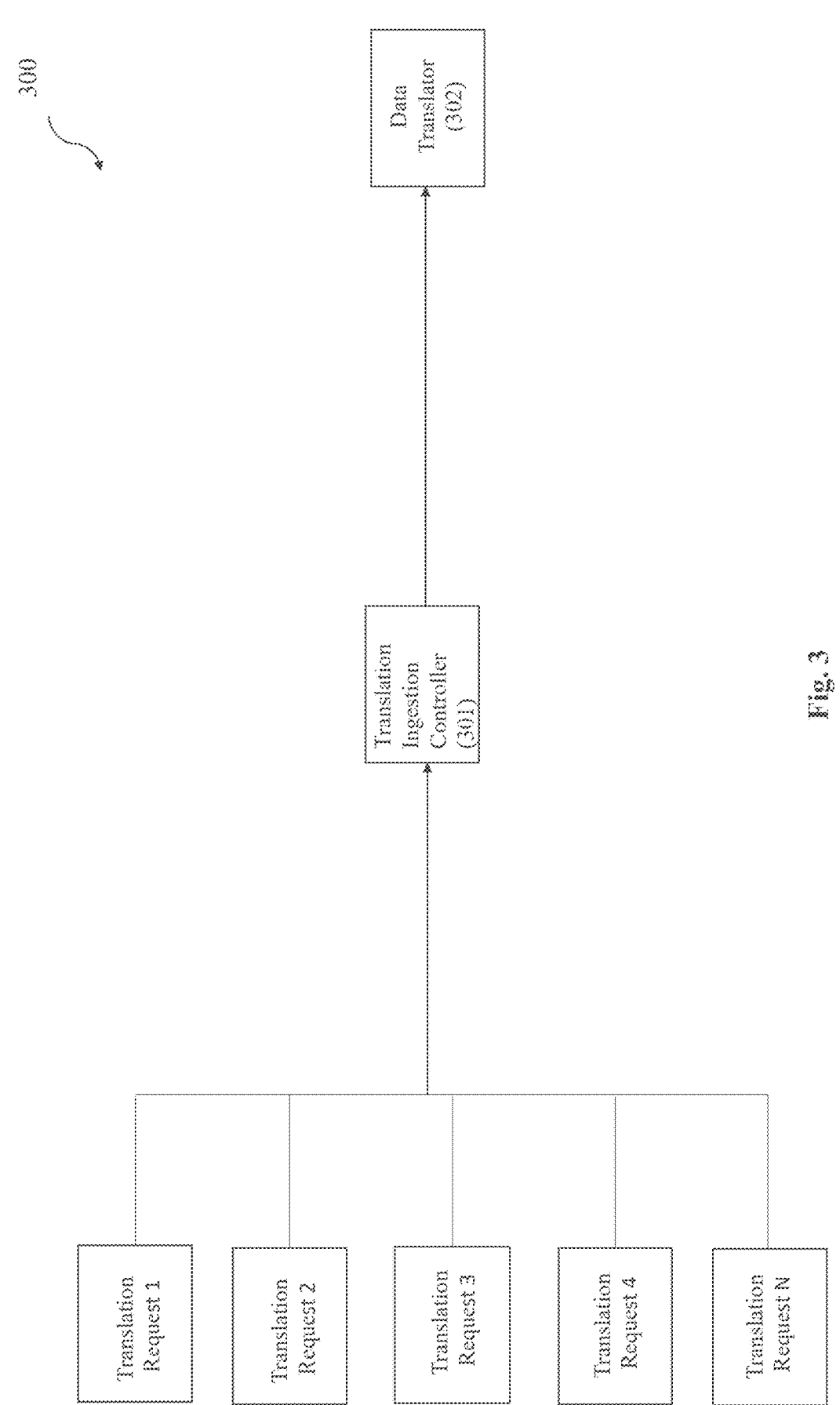
Figure 4:
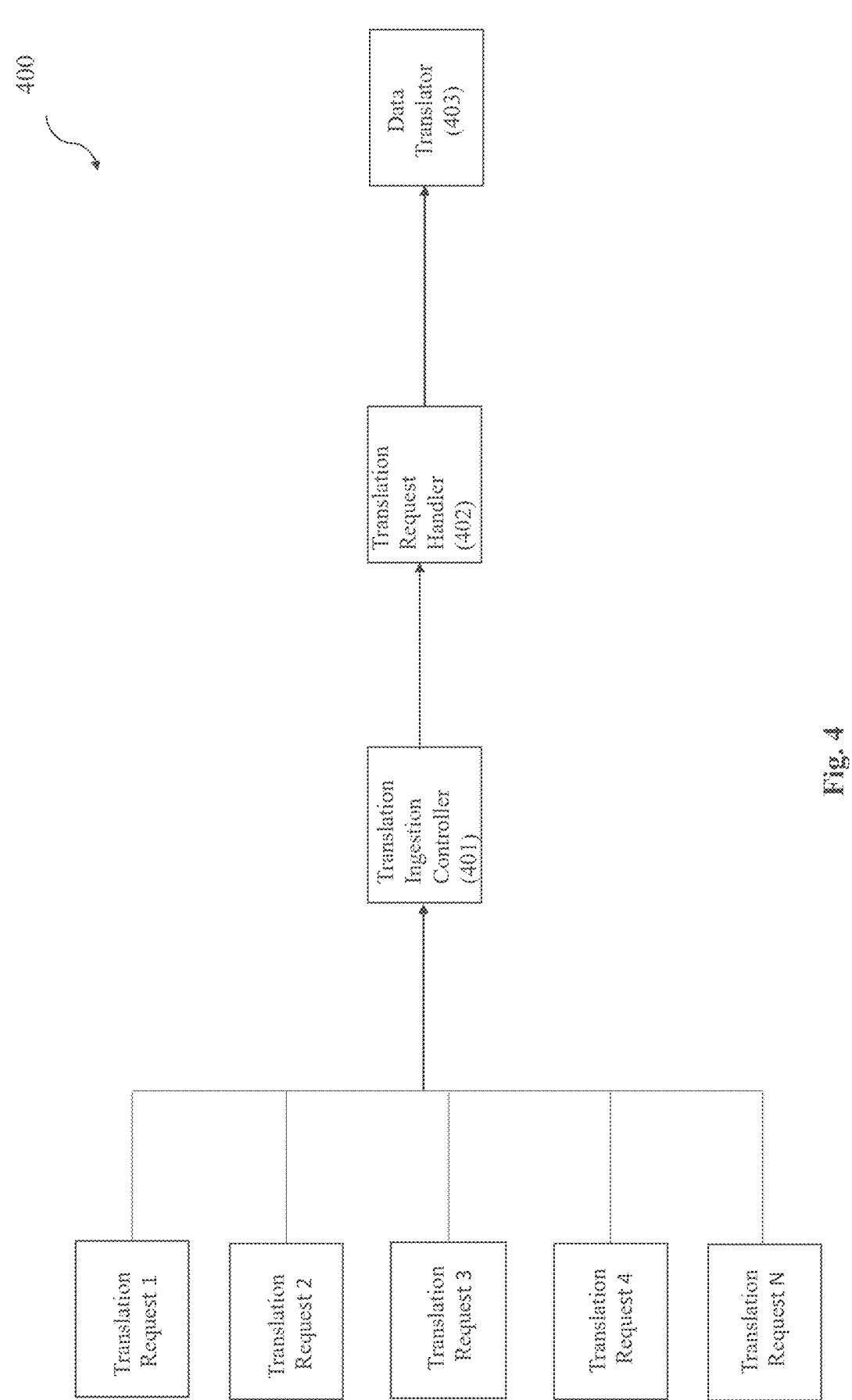
Figure 5:
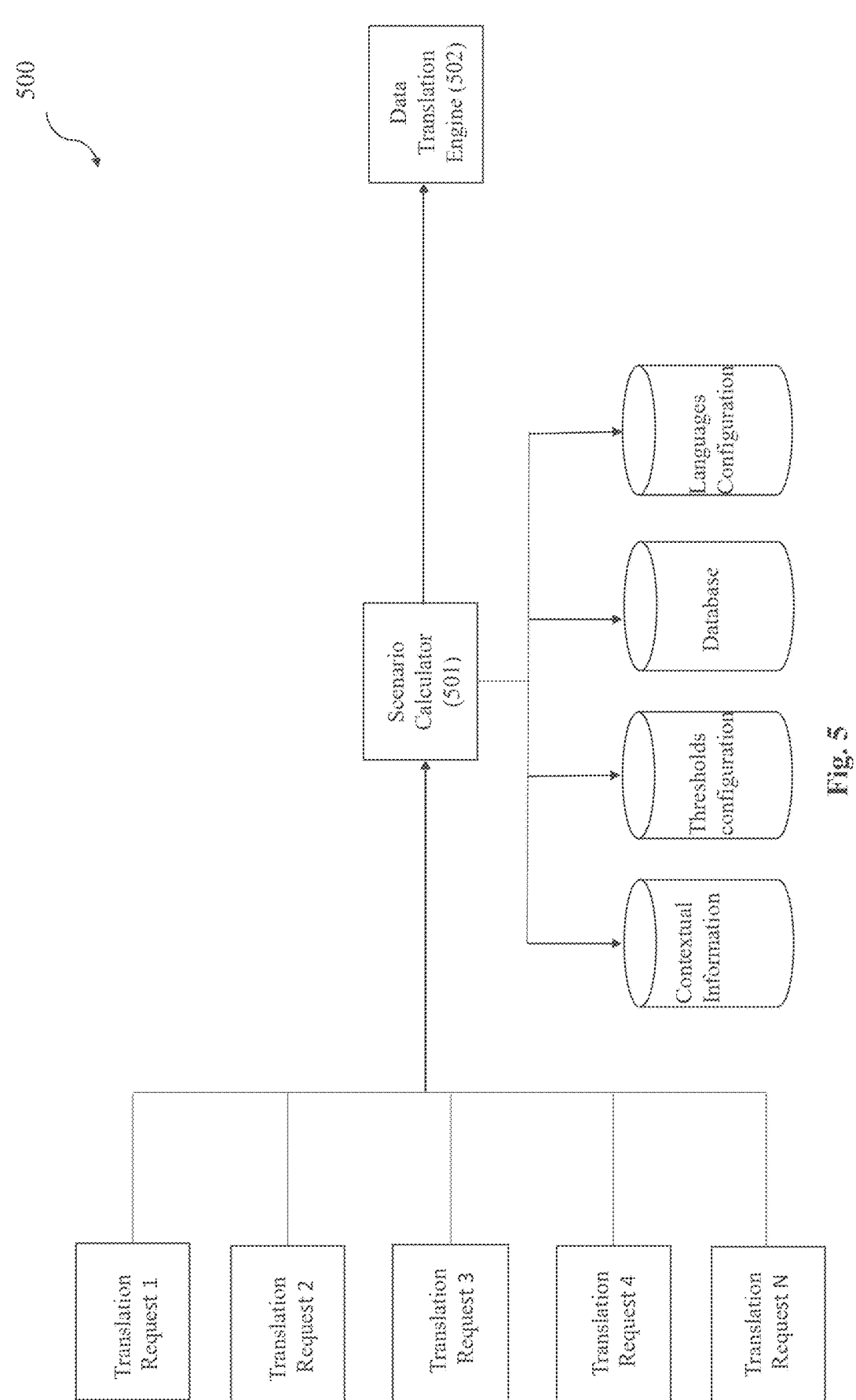
Figure 6:
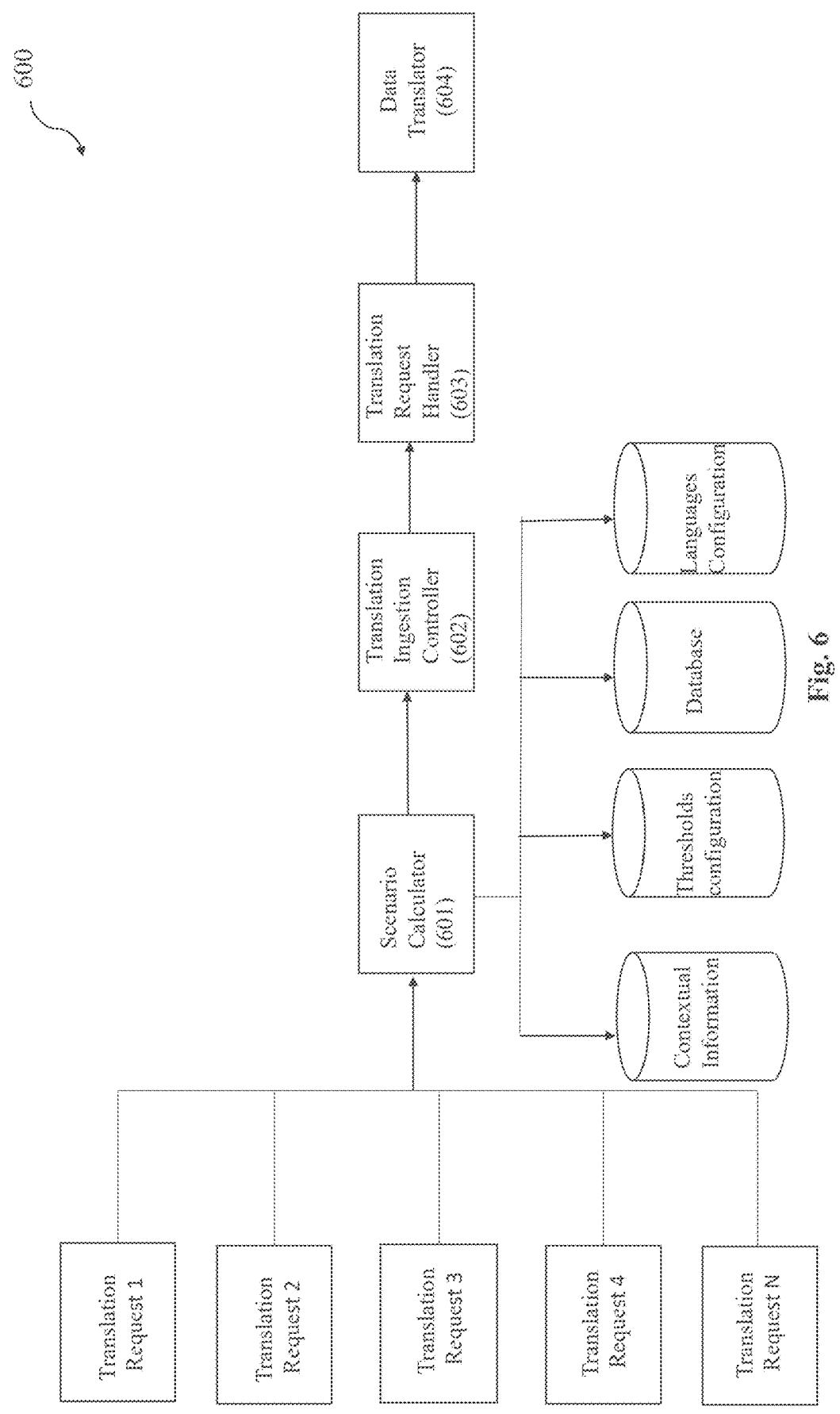
Figure 7:
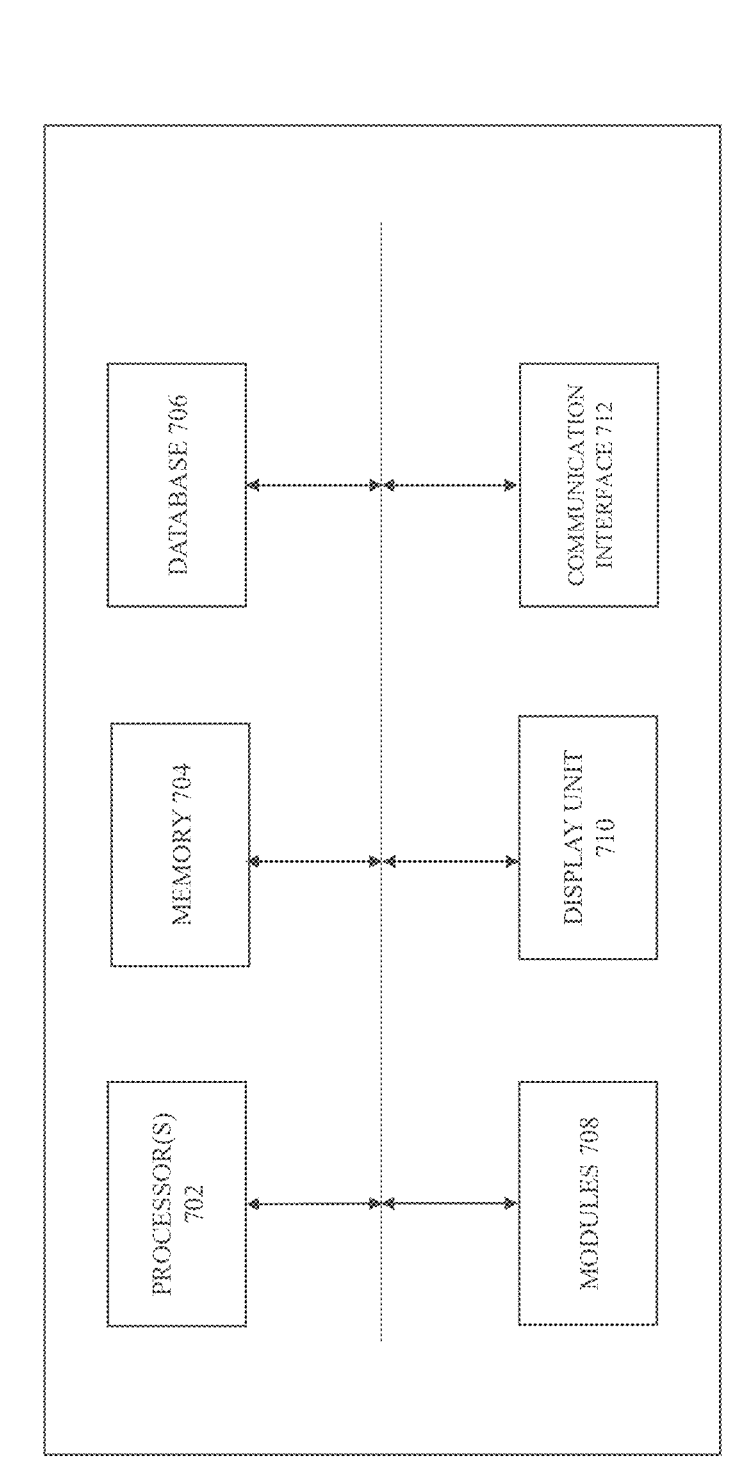
Figure 8:
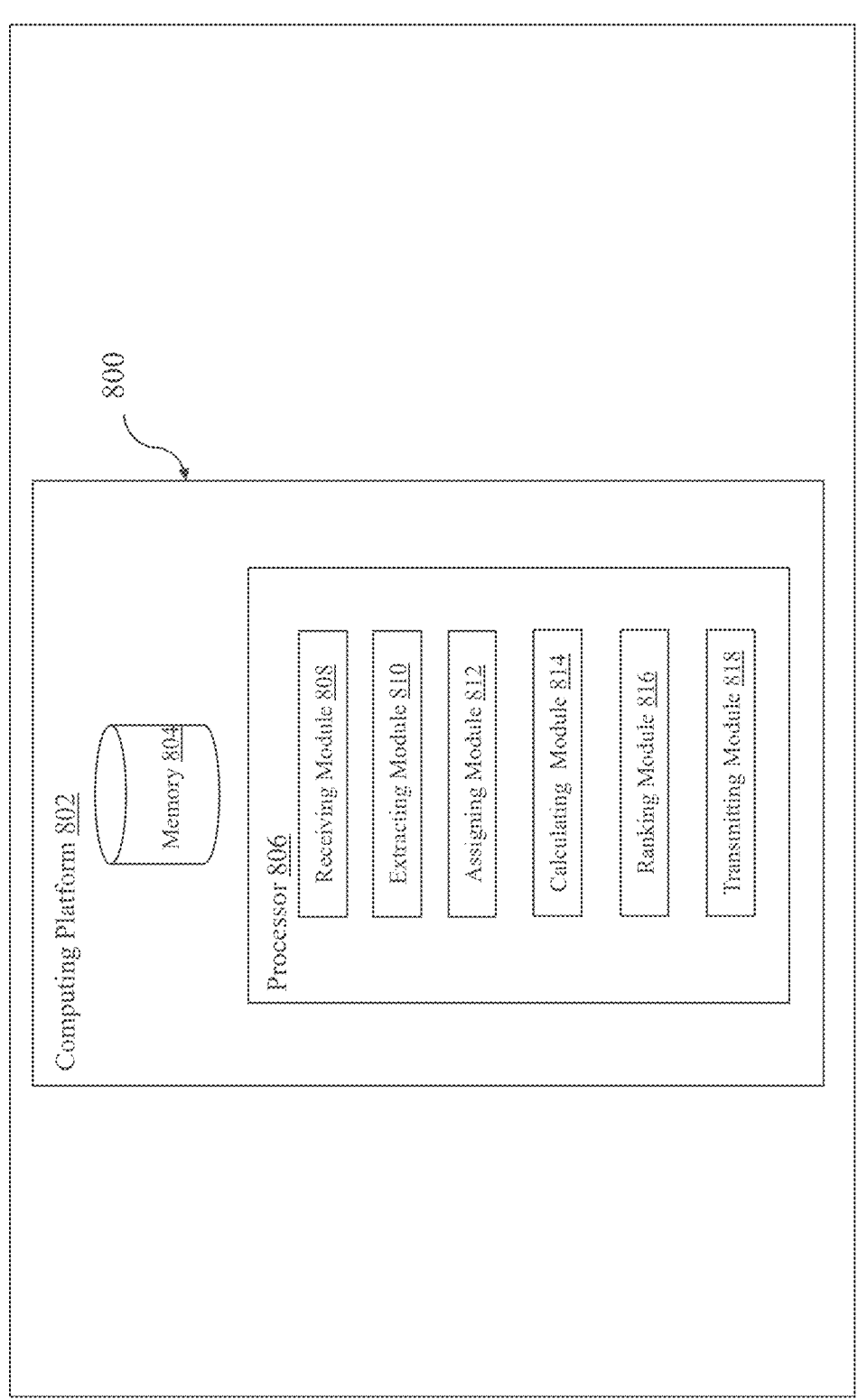

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary general architecture of a translation service system;

FIG. 3 illustrates an exemplary block diagram of a prior art translation service system;

FIG. 4 illustrates another exemplary block diagram of a prior art translation service system;

FIG. 5 illustrates an exemplary block diagram of a translation service system for prioritizing translation requests in accordance with one or more embodiments described herein;

FIG. 6 illustrates another block diagram of a translation service system for prioritizing translation requests in accordance with one or more embodiments described herein;

FIG. 7 illustrates a general block diagram of a computing system, in accordance with one or more embodiments described herein;

FIG. 8 illustrates a block diagram of a translation service system configured for prioritizing translation requests in accordance with one or more embodiments described herein;

FIG. 9 illustrates a flow diagram of a method for prioritizing translation requests in accordance with one or more embodiments described herein.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

The aim of this present disclosure is to provide a translation system and method that provides a custom solution for translation rather than a static approach for all translations. The advantage of having a custom solution is that it adapts to provide the fastest, lowest cost solution based on the expected rate of translation and expected size of translation. The objective of the present disclosure is to also prevent throttling of translation service when the rate of translation request per second exceeds a certain threshold. Typically, the threshold limits are unpredictable in most instances mostly due to large bursts in rate of translations requested per second.

The solution proposed by the present disclosure provides a technique wherein, instead of automatically submitting the request for translation or queuing the translation request for translation, the requests for translation are sent to the data translation engine by employing a scenario calculator, which is dynamic and prioritizes the translation requests before sending to the data translation engine.

The scenario calculator enables dynamically choosing a method of sending translation requests to the translation service unlike in the prior arts, wherein it remains static. The scenario calculator may be implemented as a middleware component of a language-translation system or user interface, as a standalone application, or as an on-demand or hosted service.

Embodiments of the present disclosure generally describe non-conventional approaches to systems and methods for prioritizing one or more translation requests based on one or more attributes associated with each translation request. The embodiments of the present disclosure described herein aims to improve the overall efficiency and accuracy of the translation service system. The disclosure herein describes embodiments that enhances the operations of a translation service system by providing a custom solution for prioritizing translation requests that effectively manages translation requests received from users.

FIG. 1 illustrates an exemplary block diagram of an environment 100, in which the embodiments of the present disclosure may operate. Specifically, FIG. 1 illustrates a plurality of client devices 101. In an embodiment, the plurality of client devices 101 may be in operative communication with a cloud environment 103 over a network 102. In one or more embodiments, the one or more client devices 101 is integrated within or corresponds to a mobile computing device, a smartphone, a tablet computer, a mobile computer, a desktop computer, a laptop computer, a workstation computer, a wearable device, a virtual reality device, an augmented reality device, or another type of remote computing device. Although exemplary system 100 is shown with four client devices 101, any number of client devices may be supported.

In an embodiment, the plurality of client devices 101 may be operable by one or more users or clients 105 of an enterprise to perform translation tasks from a source language to a target language typically, to achieve a particular business goal or objective. For example, enterprises may be involved in manufacturing and distribution of one or products, and the products may include but not limited to healthcare related products including medical devices, medicines, therapeutic compositions. Translation tasks of an enterprise in a non-limiting example may include operational documents, financial documents, Human Resources documents, legal documents, marketing documents, project management documents, communication documents, technical documents, strategic documents, IT and security documents, etc. For example, the documentations related to pharmaceutical industry may include, regulatory documents, quality assurance and control documents, clinical trial documents, research and development documents, manufacturing documents, supply chain and distribution documents, pharmacovigilance documents, marketing and sales documents, Human Resources documents, financial documents, etc.

According to various embodiments, a network 102 may be configured to provide communication between various components depicted in FIG. 1. In some embodiments, the network 102 may include a public network (e.g., the Internet), (e.g., an internal localized, or closed-off network between particular devices). In some other embodiments, the network 102 may be a hybrid network (e.g., a network enabling internal communications between particular connected devices and external communications with other devices). Such configuration(s) include, without limitation, a wired or wireless Personal Area Network (PAN), a Cloud network, Local Area Network (LAN), Metropolitan Area Network (MAN), Wide Area Network (WAN), and/or the like. In various embodiments, the network 102 may include one or more base station(s), relay(s), router(s), switch(es), routing station(s), and/or the like.

According to various embodiments, the cloud environment 103 may include one or more servers 104 and may provide different types of cloud computing services including but not limited to one or more services provided under Software as a Service (Saas) category, services provided under Platform as a Service (Pass) category, services provided under Infrastructure as a Service (IaaS), category. In some embodiments, the cloud environment 103 may also include server-less computing. In some embodiments, the cloud infrastructure is operated solely for an organization called the private cloud. In some embodiments, the cloud infrastructure is shared by several organizations called the community cloud. In some other embodiments, the cloud infrastructure is made available to the general public or a large industry group and is owned by an organization selling cloud services, called the public cloud. In some embodiments, the cloud infrastructure is a composition of two or more clouds (private, community, or public) that remain unique entities but are bound together by standardized or proprietary technology that enables data and application portability.

Embodiments of the present disclosure may provide for prioritizing translation requests based on one or more attributes associated with each translation request for a multi-tenant cloud-based system. Embodiments of the present disclosure may perform translation tasks both in the cloud and on-premise. Embodiments of the present disclosure may support multi-channel access via web, mobile, and application programming interfaces ("APIs"). Embodiments of the present disclosure may manage access for different users, such as customers, partners, and employees. Embodiments of the present disclosure may integrate with new and existing applications and identities.

Embodiments of the present disclosure may be based on a multi-tenant architecture for managing cloud-scale software services. Multi-tenancy refers to having one physical implementation of a service securely supporting multiple customers buying that service. A service is a software functionality or a set of software functionalities that can be reused by different clients for different purposes.

In an embodiment, the plurality of client devices 101 may be utilized by one or more clients or users 105 to connect to the cloud environment 103 via a secure communication channel over the network 102. The users 105 operating one or more client devices 101 may perform translation tasks to translate from the source language to the target language.

FIG. 2 illustrates an exemplary general architecture of a translation service system. According to an example embodiment, as depicted in FIG. 2, the translation service system 200 comprises a data storage module 201 coupled with a data processing module 202. In an embodiment, the data storage module 201 is configured to store incoming translation requests received from one or more users 105 (FIG. 1). The data processing module 202 may receive and process the plurality of translation requests as described in detail in FIGS. 3-6.

According to an embodiment, the data processing module 202 may be configured to receive the plurality of translation requests from one or more users 105. For example, the plurality of translation requests received may be in plurality of languages. The language of the incoming request may be called as the source language. The source language of the plurality of translation requests may include text from various languages. The incoming translation request may be processed by the data processing module 202 to ascertain the details of requests such as source language, target language, content type, any translation specific instructions, etc. Further, the data processing module 202 may be configured to transmit the processed translation requests to the data translation engine for conversion from source language to the target language.

In another embodiment, the data processing module 202 is coupled with a data translation engine 203. The data translation engine 203 may receive the plurality of translation requests that are processed by the data processing module 202. The data translation engine 203 may translate the processed requests from the source language to the target language.

FIG. 3 illustrates an exemplary block diagram of a prior art translation service system. According to an example embodiment depicted in FIG. 3, the translation service system 300 comprises a translation ingestion controller 301 coupled to a data translator 302. In an embodiment, the translation ingestion controller 301 is configured to store incoming translation requests received from one or more users 105. The translation ingestion controller 301 and data translator 302 includes an application, module or system that may process the received plurality of translation requests. In an embodiment, the translation ingestion controller 301 may be configured to transmit the incoming translation requests to data translator 302 for translation.

In an embodiment, the translation ingestion controller 301 may be configured to receive the plurality of translation requests from one or more users 105. The translation ingestion controller 301 may be configured to send one request at a time to the data translator 302 for translation service. The translation ingestion controller 301 may receive response for each translation which may be stored and the content in the source language is translated to the target language.

For example, the translation ingestion controller 301 may be configured to receive millions of translation requests from the one or more users 105. The translation ingestion controller 301 may be configured to distribute incoming traffic of requests across multiple instances. The translation ingestion controller 301 may be configured to send multiple requests at a time to data translator for translation. The translation ingestion controller 301 may be configured to prevent receiving requests from the one or more users. The translation ingestion controller 301 may be configured to send a notification to the one or more users and may request the one or more users to send the requests later. The translation ingestion controller 301 may be configured to store the large volume of incoming requests and may configured to process one request at a time.

FIG. 4 illustrates another exemplary block diagram of a prior art translation service system. According to the example depicted in FIG. 4, the translation service system 400 comprises a translation ingestion controller 401 and a translation request handler 402 coupled with a data translator 403. In an embodiment, the translation ingestion controller 401 may be configured to store incoming translation requests received from one or more users 105. The translation ingestion controller 401, translation request handler 402 and data translator 403 includes an application, module or system that may process the received one or more translation requests. In an embodiment, the translation ingestion controller 401, translation request handler 402 may be configured to transmit the incoming translation requests to data translator 403 for translation.

In an example, the translation ingestion controller 401 may be configured to receive the plurality of translation requests from one or more users 105. The translation request handler 402 may be configured to queue the incoming requests received from the translation and send one request at a time to the data translator 403 for translation service. The translation request handler 402 may receive response of each translation which may be stored and the content in the source language is translated to the target language.

In another example, the translation ingestion controller 401 may be configured to receive millions of translation requests from the one or more users 105. The translation request handler 402 may be configured to distribute incoming traffic across multiple instances. The translation request handler 402 may be configured to send multiple requests at a time to data translator for translation. The translation request handler 402 may be configured to prevent receiving requests from the at least one of the one or more users. The translation request handler 402 may be configured to send a notification to at least one of the one or more users and may request the users to send the requests later. The translation request handler 402 may be configured to store the large volume of incoming translation requests and may be configured to process one request at a time. The translation request handler 402 may be configured to queue the incoming translation requests and may be configured to notify the one or more users asynchronously. The translation request handler 402 may be configured to queue the incoming requests when the requests exceed the system's processing capacity and may be configured to send the requests to the data translator for processing when resources are available. The translation request handler 402 may be configured to combine the one or more translation requests together and send them as single request separated by delimiters to the data translator if the requests are within the system's processing capacity. The translation request handler 402 may be configured to send the one or more translation requests as a giant string and may be configured to parse the translated string to replace the source language with the target language.

Handling large volume of requests as discussed in FIG. 3 and queuing high volume of requests as explained in FIG. 4, has its own set of disadvantages and drawbacks. For example, when large number of translation requests are sent to data translator, there will be cost implications as the infrastructure of the system has to be scaled to manage the large number of incoming requests. Handling a high volume of requests requires sufficient computing resources, both for sending and receiving requests, as well as for processing translations. Further, scaling the infrastructure to handle large volume of requests may lead to management complexity. Further, there are performance issues as processing of high number of requests can introduce latency and may delay or throttle the system leading to reduced throughput.

Further, the error rates may be high if the system cannot handle the load effectively thereby affecting the overall efficiency of the system. As the number of incoming requests vary from time to time, there may be consistency issues, as the system follows a static approach for all the incoming requests.

Thus, the above two methods of transmitting the translation requests to data translator in the translation service system have respective disadvantages. Handling large volume of translation requests in a translation service system can introduce challenges related to latency, cost, scalability, complexity, error handling, system bottlenecks, quality, management, etc.

The present disclosure therefore provides a system for prioritizing one or more translation requests based on one or more attributes associated with each translation request and associated method thereof. According to an embodiment of the present disclosure, techniques are provided wherein, instead of automatically submitting the request for translation or queuing the translation request, the requests for translation are sent to the data translation engine by employing a scenario calculator, which dynamically prioritizes the translation requests based on one or more attributes associated with each translation request. The present disclosure provide a custom solution for translation based on the current scenario rather than a singular approach for all translations. The advantage of having a custom solution is that it adapts to provide the fastest, lowest cost solution based on the expected rate of translation and expected size of translation. The embodiment of the present disclosure achieves a technical effect of preventing throttling of translation services when the rate of translations requests per second exceeds a certain threshold. Typically, the threshold limits are unpredictable in most instances mostly due to large bursts in rate of translations requested per second.

Specific embodiments are used below to describe in detail the technical solutions of the present disclosure. The following several specific embodiments may be combined with each other, and a same or similar concept or process may not be described repeatedly in some embodiments.

FIG. 5 illustrates an exemplary block diagram of a translation service system in accordance with the embodiments of the present disclosure. According to the example embodiment depicted in FIG. 5, the translation service system 500 comprises a scenario calculator 501 that is coupled with a data translator 502. In an embodiment, the scenario calculator 501 may be configured to store incoming translation requests received from one or more users 105. The scenario calculator 501 and data translator 502 includes an application, module or system that may process the received one or more translation requests. In an embodiment, the scenario calculator 501 may be configured to transmit the incoming translation requests to data translator 502 for translation.

In an embodiment, the scenario calculator 501 may be configured to receive the plurality of translation requests from the one or more users 105. The scenario calculator 501 may be configured to extract one or more attributes associated with the one or more translation requests, wherein the one or more attributes include at least one of: contextual information, frequency, size and language configuration of the one or more translation requests. The scenario calculator 501 may be configured to assign a weight to each attribute of the one or more translation requests. The scenario calculator 501 may be configured to calculate a weighted score for the one or more translation requests based on the assigned weight to each attribute of the one or more attributes. The scenario calculator 501 may be configured to rank the one or more translation requests based on the weighted score. The scenario calculator 501 may be configured to transmit the one or more translation requests based on the rank to a data translation engine for translation.

In an example, the scenario calculator 501 may be configured to extract the contextual information of the translation requests. The contextual information may be at least one of category, urgency, purpose, etc. of the translation requests. The processor may assign a weight to the attribute for each translation request based on their relative importance. The assigned weight may be adjusted based on the purpose, category, urgency, etc. of the translation requests. For example, the requests related to life-saving drugs may be prioritized over the requests related to other drugs. Likewise, the requests related to audits, compliances, policies, etc., may be prioritized over the other requests. If the plurality of requests received from the one or more users are ranked equally based on the contextual information attribute, the requests may be ranked based on the other attributes, for example, frequency, size, language configuration, etc. of the one or more translation requests.

In an example, the scenario calculator 501 may be configured to determine the frequency of the translation requests received from the one or more users. In another example, the volume and rate of the requests received from the users are determined. In yet another example, the number of the translation requests executed by the at least one or more users simultaneously are determined. The assigned weight may be adjusted based on the volume and rate of the translation requests. For example, the users executing a large number of requests may be prioritized over the users executing a smaller number of requests. If number of the requests are executed simultaneously by the users, the requests may be ranked based on the other attributes, for example, contextual information, size, language configuration, etc. of the one or more translation requests.

In an example, the scenario calculator 501 may be configured to determine the size of the translation requests by calculating the number of rows and columns (and cells) that have to be translated. The size of the requests has been analyzed to determine whether to send the requests to the data translation engine as a single translation request separated by delimiters or send multiple translation requests through a queue. If the total number of cells to be translated is below a pre-defined threshold then the at least one of the translation requests can be sent as a giant string to data translation engine for translation and each row and column of the translated string is parsed to replace a source language with a target language. In some embodiments, the translated string may be stored and reconciled using the delimiter string. However, if the total number of cells to be translated exceeds the pre-defined threshold then the translation requests are sent through a queue. For example, the requests that can be sent as single translation request to the translation engine may be prioritized over the requests that can be sent through queue. If the size of the requests received from the one or more users is below the pre-defined threshold, the requests maybe ranked based on the other attributes, for example, contextual information, frequency, language configuration, etc. of the one or more translation requests.

In an example, the scenario calculator 501 may be further configured to identify the language to which the requests need to be translated. The language is determined to analyze the expected bytes required for the translation. The assigned weight may be adjusted based on the type of language, expected bytes per translation, etc. of the translation requests. For example, the requests with language configuration that requires less bytes per translation may be prioritized over the requests with the language configuration that requires more bytes per translation. If the requests received from the one or more users has to be translated to the same target language, the requests may be ranked based on the weights assigned to other attributes, for example, contextual information, size, frequency, etc. of the one or more translation requests.

FIG. 6 illustrates another block diagram of a translation service system in accordance with the embodiments of the present disclosure. According to the example embodiment as depicted in FIG. 6, a scenario calculator 601 is coupled to a data translator 604. In an example embodiment as depicted in FIG. 6, a scenario calculator 601 is coupled with a translation ingestion controller 602 and a data translator 604. In an example embodiment as depicted in FIG. 6, a scenario calculator 601 is coupled with a translation ingestion controller 602, a translation request handler 603 and a data translator 604. In an embodiment, the scenario calculator 601 may be configured to store incoming translation requests received from one or more users 105. The scenario calculator 601, translation ingestion controller 602, translation request handler 603 and data translator 604 includes an application, module or system that may process the received one or more translation requests. In an embodiment, the scenario calculator 601, translation ingestion controller 602, translation request handler 603 may be configured to transmit the incoming translation requests to data translator 604 for translation.

In an embodiment, the scenario calculator 601 may be configured to receive the plurality of translation requests from the one or more users 105. The scenario calculator 601 may be configured to extract one or more attributes associated with the one or more translation requests, wherein the one or more attributes include at least one of: contextual information, frequency, size and language configuration of the one or more translation requests. The scenario calculator 601 may be configured to assign a weight to each attribute of the one or more translation requests. The scenario calculator 601 may be configured to calculate a weighted score for the one or more translation requests based on the assigned weight to each attribute of the one or more attributes. The scenario calculator 601 may be configured to rank the one or more translation requests based on the weighted score. The scenario calculator 601 may be configured to transmit the one or more translation requests based on the rank to a data translation engine for translation.

In an embodiment, the translation ingestion controller 602 and the translation request handler 603 may be configured to send multiple requests at a time to data translator 604 for translation based on the rank of the one or more translation requests. The translation ingestion controller 602 and the translation request handler 603 may be configured to store the large volume of incoming translation requests and may be configured to process one request at a time based on the rank of the one or more translation requests. The translation ingestion controller 602 and the translation request handler 603 may be configured to queue the incoming translation requests and may be configured to notify the one or more users asynchronously based on the rank of the one or more translation requests. The translation ingestion controller 602 and the translation request handler 603 may be configured to queue the incoming one or more translation requests when the requests exceeds the system's processing capacity and may be configured to send the requests to the data translator for processing when resources are available based on the rank of the one or more translation requests. The translation ingestion controller 602 and the translation request handler 603 may be configured to combine the one or more translation requests together and send them as single request separated by delimiters to the data translator if the requests are within the system's processing capacity based on the rank of the one or more translation requests. The translation ingestion controller 602 and the translation request handler 603 may be configured to send the one or more translation requests as a giant string and may be configured to parse the translated string to replace the source language with the target language capacity based on the rank of the one or more translation requests.

In an example, when the system receives plurality of translation requests from the one or more users, the system as illustrated in the FIG. 6 may prioritize translation requests related to life-saving drugs over the other requests based on the extracted contextual information of the requests. Likewise, the requests related to audits, compliances, policies, etc., may be prioritized over the other requests. In another example, if the requests have the same ranking, based on the contextual information, then the requests may be prioritized based on the other attributes, for example, frequency, size and language configuration of the requests. In yet another example, the system may prioritize the users executing larger number of requests over the users with smaller number of requests. For example, if a user executes multiple requests simultaneously, the requests may be ranked based on the other attributes, for example, contextual information, size and language configuration of the requests.

In an example, the system as illustrated in FIG. 6 may define a threshold for number of requests to be handled at a time based on the infrastructure. Defining the threshold of the system aids in determining whether to send the multiple requests to the data translation engine as a single translation request separated by delimiters or send multiple translation requests through a queue. In an example, if the total number of cells to be translated is below a pre-defined threshold, the translation requests may be sent as a giant string to data translation engine for translation. However, if the total number of cells to be translated exceeds the pre-defined threshold, the translation requests may be sent through a queue. In yet another example, the requests that may be sent as single translation request to the translation engine may be prioritized over the requests that may be sent through queue. If the size of one or more requests received from the users are below the pre-defined threshold, the requests may be ranked based on the other attributes, for example, contextual information, frequency, language configuration etc. of the requests.

In an example, the system may be configured to identify the target language of the requests to determine the expected bytes required for the translation. In another example, the system may be configured to prioritize requests with language configuration that requires less bytes per translation over the requests with the language configuration that requires more bytes per translation. In another example, if the requests received from the one or more users has to be translated to the same target language, the requests may be ranked based on the weights assigned to other attributes, for example, contextual information, frequency, size, etc. of the requests.

FIG. 7 illustrates a general block diagram of an exemplary computing system 700 used in system 100, 200, 300, 400, 500, 600 for prioritizing one or more translation requests according to an embodiment of the present disclosure. The system shown in FIG. 7 may be a translation service system disclosed in the foregoing embodiments of this present disclosure, and perform the method performed by the translation service system. As shown in FIG. 7, the computing system 700 may include a processor 702, communication interface 712 and memory 704. Optionally, the system 700 may further include database 706, modules 708 and display unit 710. The memory 704 may be disposed inside the apparatus, or may be disposed outside the apparatus.

The computing system 700 includes a processor 702 which may be a single processing unit or a number of units, all of which could include multiple computing units. The processor 702 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 702 is configured to fetch and execute computer-readable instructions and data stored in a memory 704.

The memory 704 may be any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The computing system 700 may comprise a database 706 and may be implemented with integrated hardware and software. The hardware may include a hardware disk controller with programmable search capabilities or a software system running on general-purpose hardware. Examples of databases are but not limited to, in-memory databases, cloud databases, distributed databases, embedded databases, and the like. The database amongst other things, serves as a repository for storing data processed, received, and generated by one or more of the processors 702, and the module(s) 708. In an embodiment, the modules 708 may be implemented with an AI module.

In an example, the computing system 700 may include one or more software modules or components 708 for prioritizing one or more translation requests based on one or more attributes associated with each translation request in accordance with the one or more embodiments of the present disclosure. In an embodiment, the one or more software modules 708 may include a program, a subroutine, a portion of a program, a software component or a hardware component capable of performing a stated task or function. As used herein, the modules may be implemented on a hardware component such as a server independently of other modules, or a module can exist with other modules on the same server, or within the same program. The module(s) 708 may be implemented on a hardware component such as processor one or more microprocessors, microcomputers, microcontrollers, digital signal processors, central processing units, state machines, logic circuitries, and/or any devices that manipulate signals based on operational instructions. The module(s) 708 when executed by the processor 708 may be configured to perform any of the described functionalities. Specifically, the module(s) 708 may be configured to implement efficient and flexible translation service system.

The computing system 700 comprises a display unit 710 that includes a computer monitor, a touch screen, an output device capable of displaying the graphics, and the like. The display unit 710 is configured to display visual output in desktops, laptops, and workstations.

The computing system 700 comprises a communication interface 712 configured to provide and establish communication with any electronic device via a public network, private network, or any wireless communication technology.

For example, actions performed by the translation service system in FIG. 1 to FIG. 6 may all be implemented by the processor 702. The processor 702 receives data by using the communications interface 712, and is configured to implement any method performed by the translation service system in FIG. 1 to FIG. 6. In an implementation process, each step of the processing procedure may be implemented by using an integrated logical circuit of hardware in the processor 702 or an instruction in a form of software, to implement the method performed by the edge device in FIG. 1 to FIG. 6. Program code executed by the processor 702 to implement the foregoing method may be stored in the memory 704.

In addition, an embodiment of the present disclosure further provides another structure of a computing apparatus that can be used to implement a translation service system provided in this present disclosure. FIG. 8 illustrates a block diagram of a translation service system configured for prioritizing translation requests in accordance with the embodiments of the present disclosure. The system shown in FIG. 8 may be a translation service system in the foregoing embodiments of the present disclosure, and performs the method performed by the translation service system. In some implementations, system 800 may include one or more computing platforms 802. Computing platform(s) 802 may be configured by memory 804 in communication with the processor 806. The Processor 806 may include a receiving module 808, an extracting module 810, an assigning module 812, a calculating module 814, a ranking module 816 and a transmitting module 818. The receiving module 808 is configured to receive the one or more translation requests from the one or more users. The extracting module 810 is configured to extract one or more attributes associated with the one or more translation requests, wherein the one or more attributes include at least one of: contextual information, frequency, size and language configuration of the one or more translation requests.

Optionally, the extracting module 810 is further configured to extract the contextual information from the one or more translation requests, wherein the contextual information comprises at least one of: a purpose, a category and an urgency of the one or more translation requests.

Optionally, the extracting module 810 is further configured to determine the frequency of the one or more translation requests and may calculate a load factor based on the frequency of the one or more translation requests.

Optionally, the extracting module 810 is further configured to determine, based on the size of the one or more translation requests, whether to send a single translation request separated by delimiters or send multiple translation requests through a queue.

Optionally, the extracting module 810 is further configured to send the one or more translation requests as a giant string for translation and parse the translated string to replace a source language with a target language, if the size of the one or more translation requests is below a pre-defined threshold.

Optionally, the extracting module 810 is further configured to send the one or more translation requests through the queue, if the size of the one or more translation requests exceeds the pre-defined threshold.

Optionally, the extracting module 810 is further configured to identify the target language and number of bytes per translation for the one or more translation requests.

The assigning module 812 is configured to assign a weight to each attribute of the one or more translation requests.

The calculating module 814 is configured to calculate a weighted score for the one or more translation requests based on the assigned weight to each attribute of the one or more attributes.

The ranking module 816 is configured to rank the one or more translation requests based on the weighted score.

The transmitting module 818 is configured to transmit the one or more translation requests based on the rank to a data translation engine for translation.

It should be noted that, it should be understood that division of the modules of the foregoing apparatus is merely division of logical functions, and in actual implementation, all or some modules may be integrated into one physical entity, or may be physically separated. In addition, all of these modules may be implemented in a form of invoking software by a processor element, or all of these modules may be implemented in a form of hardware, or some modules are implemented in a form of invoking software by a processor element, and some modules are implemented in a form of hardware. For example, the receiving module may be a separately disposed processor element, or may be integrated into a chip of the foregoing apparatus for implementation. In addition, the receiving module may alternatively be stored in a memory of the foregoing apparatus in a form of program code, and a processor element of the foregoing apparatus invokes and executes a function of the foregoing receiving module. Implementation of other modules is similar to that of the receiving module. In addition, all or some of these modules may be integrated together, or may be implemented separately. The processor element described herein may be an integrated circuit and has a signal processing capability. In an implementation process, steps in the foregoing methods or the foregoing modules can be implemented by using a hardware integrated logical circuit in the processor element, or by using instructions in a form of software.

For example, the foregoing modules may be one or more integrated circuits configured to implement the foregoing method, for example, one or more application-specific integrated circuits (ASIC), or one or more microprocessors (DSP), or one or more field programmable gate arrays (FPGA), or the like. In another example, when one of the foregoing modules is implemented in a form of invoking program code by a processor element, the processor element may be a general-purpose processor, for example, a central processing unit (CPU) or another processor that can invoke the program code. For another example, the modules may be integrated together and implemented in a form of a system-on-a-chip (SOC).

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Some features in this embodiment of this present disclosure may be implemented/supported by the processor 702 by executing program instructions or software code in the memory 704. Software components loaded on the memory 704 may be summarized from a functional or logical perspective, for example, the receiving module 808, the extracting module 810, the assigning module 812, the calculating module 814, the ranking module 816 and the transmitting module 818 shown in FIG. 8.

FIG. 9 illustrates an exemplary method for prioritizing one or more translation requests in a translation service system in accordance with one or more embodiments described herein. The method, 900 may be implemented by the system as described above in FIGS. 1, 7 and 8. The method 900 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. The order in which the operations are described is not intended to be construed as a limitation, and any number of the described operations can be combined in any order and/or in parallel to implement the method.

According to an embodiment, the method 900 may be implemented by one or more processors or modules illustrated and explained through FIGS. 1, 7 and 8, therefore detailed explanation of the same is omitted here for the sake of brevity.

The method begins at step 902, wherein the method 900 includes receiving the one or more translation requests from the one or more users 105 on the one or more client devices 101. In an embodiment, the plurality of client devices 101 may be operable by one or more users 105 of an enterprise or organization to perform a translation tasks typically to achieve a particular business goal or objective. For example, enterprises may be involved in manufacturing and distribution of one or products, and the products may include but not limited to healthcare related products including medical devices, medicines, therapeutic compositions. Translation tasks of an enterprise in a non-limiting example may include operational documents, financial documents, Human Resources documents, legal documents, marketing documents, project management documents, communication documents, technical documents, strategic documents, IT and security documents, etc. For example, the documentations related to pharmaceutical industry may include, regulatory documents, quality assurance and control documents, clinical trial documents, research and development documents, manufacturing documents, supply chain and distribution documents, pharmacovigilance documents, marketing and sales documents, Human Resources documents, financial documents, etc.

At 904, the method 900 includes extracting one or more attributes associated with the one or more translation requests, wherein the one or more attributes include at least one of: contextual information, frequency, size and language configuration of the one or more translation requests. In an embodiment, the operations at step 904 may be performed by the system of FIGS. 1, 7 and 8. In an embodiment, the one or more attributes extracted from the one or more translation requests may include at least one of: contextual information, frequency, size and language configuration of the one or more translation requests. In an embodiment, the contextual information extracted from the one or more translation requests comprises at least one of: a purpose, a category and an urgency of the one or more translation requests. In an embodiment, the frequency of the one or more translation requests is determined to calculate a load factor. In an embodiment, the size of the one or more translation requests is determined, whether to send a single translation request separated by delimiters or send multiple translation requests through a queue. In an embodiment, the target language and number of bytes per translation for the one or more translation requests is identified.

At 906, the method 900 includes assigning a weight to each attribute of the one or more translation requests. In an embodiment, the operations at step 903 may be performed by system of FIGS. 1, 7 and 8.

At 908, the method 900 includes calculating a weighted score for the one or more translation requests based on the assigned weight to each attribute of the one or more attributes. In an embodiment, the operations at step 908 may be performed by the system described in FIGS. 1, 7 and 8.

At step 910, the method 900 includes ranking the one or more translation requests based on the weighted score. In an embodiment, the operations at step 910 may be performed by the system described in FIGS. 1, 7 and 8.

At step 912, the method 900 includes transmitting the one or more translation requests based on the rank to the data translation engine for translation. In an embodiment, the operations at step 912 may be performed by the system of FIGS. 1, 7 and 8.

According to an embodiment, prioritizing one or more translation requests based on one or more attributes associated with each translation request prevents throttling of translation service when the rate of translations request per seconds exceeds a certain threshold.

Embodiments of the present disclosure may provide an efficient system and method for prioritizing one or more translation requests based on one or more attributes associated with each translation request. The disclosed techniques streamline the translation service by reducing costs, optimizing resources, effective management, improved accuracy, thereby providing enhanced system performance.

The disclosed system and method may also leverage the possibility of using Artificial intelligence (AI) models to implement the various functionalities disclosed herein. The AI models may be utilized to prioritize the one or more translation request in a translation service system efficiently.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment). The present disclosure intends to include specific reference to all combinations and sub combinations of physically compatible features, components, apparatuses, and processes described herein. As used herein, the term "or" is used in both the alternative and conjunctive sense, unless otherwise indicated. Use of any such aforementioned terms, or similarly interchangeable terms, should not be taken to limit the spirit and scope of embodiments of the present disclosure. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

In an embodiment, the functional units have been labeled as modules, in order to more particularly emphasize their implementation independence. For example, a module may be implemented as a hardware or a software by various types of processors. A module of executable code may, for instance, comprise one or more physical or logical blocks of computer instructions, which may, for instance, be organized as an object, procedure, or function. Nevertheless, the executables of a module need not be physically located together, but may comprise disparate instructions stored in different locations which, when joined logically together, comprise the module and achieve the stated purpose for the module.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

Processor may be embodied in a number of different ways. In various embodiments, the use of the terms "processor" should be understood to include a single core processor, a multi-core processor, multiple processors and/or one or more remote or "cloud" processor(s). In some example embodiments, processor may include one or more processing devices configured to perform independently. In some embodiments, the processor includes hardware, software, firmware, and/or a combination thereof that performs one or more operations described herein.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments, a storage system or other management entity within the artificial intelligence and machine learning infrastructure may also implement automated training with continuous learning based on new data.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed:

1. A system for prioritizing one or more translation requests, comprising:

one or more processors;

a memory; and one or more programs stored in the memory, the one or more programs when executed, cause the one or more processors to:

receive the one or more translation requests;

extract one or more attributes associated with the one or more translation requests;

assign a weight to each attribute of the one or more translation requests based on a relative importance of the each attribute with the one or more translation requests for controlling transmission of the one or more translation requests, wherein the one or more attributes associated with the one or more translation requests include at least one of: contextual information, frequency, size and language configuration of the one or more translation requests;

calculate a weighted score for the one or more translation requests based on the assigned weight to each attribute of the one or more attributes;

rank the one or more translation requests based on the weighted score;

determine, based on the size of each of the one or more translation requests, whether to transmit a translation request as a single translation request when the size is below a pre-defined threshold; and transmit the one or more translation requests based on the rank for translation.

2. The system of claim 1, wherein the one or more processors are configured to:

extract the contextual information from the one or more translation requests, wherein the contextual information comprises at least one of: a purpose, a category and an urgency of the one or more translation requests.

3. The system of claim 1, wherein the one or more processors are configured to:

determine the frequency of the one or more translation requests; and calculate a load factor based on the frequency of the one or more translation requests.

4. The system of claim 1, wherein the one or more processors are configured to:

determine, based on the size of the one or more translation requests, whether to send the single translation request separated by delimiters or send multiple translation requests through a queue.

5. The system of claim 4, wherein if the size of the one or more translation requests is below the pre-defined threshold, the one or more processors are configured to:

send the one or more translation requests as a giant string for translation; and parse the translated string to replace a source language with a target language.

6. The system of claim 5, wherein if the size of the one or more translation requests exceeds the pre-defined threshold, the one or more processors are configured to:

send the one or more translation requests through the queue.

7. The system of claim 5, wherein the one or more processors are configured to:

identify the target language and number of bytes per translation for the one or more translation requests.

8. A method for prioritizing one or more translation requests, comprising:

receiving the one or more translation requests;

extracting one or more attributes associated with the one or more translation requests;

assigning a weight to each attribute of the one or more translation requests based on a relative importance of the each attribute with the one or more translation requests for controlling transmission of the one or more translation requests, wherein the one or more attributes associated with the one or more translation requests include at least one of: contextual information, frequency, size and language configuration of the one or more translation requests;

calculating a weighted score for the one or more translation requests based on the assigned weight to each attribute of the one or more attributes;

ranking the one or more translation requests based on the weighted score;

determining, based on the size of each of the one or more translation requests, whether to transmit a translation request as a single translation request when the size is below a pre-defined threshold; and transmitting the one or more translation requests based on the rank for translation.

9. The method of claim 8, comprising:

extracting the contextual information from the one or more translation requests, wherein the contextual information comprises at least one of: a purpose, a category and an urgency of the one or more translation requests.

10. The method of claim 8, comprising:

determining the frequency of the one or more translation requests;

calculating a load factor based on the frequency of the one or more translation requests.

11. The method of claim 8, comprising:

determining, based on the size of the one or more translation requests, whether to send the single translation request separated by delimiters or send multiple translation requests through a queue.

12. The method of claim 11, wherein if the size of the one or more translation requests is below the pre-defined threshold, the method comprising:

sending the one or more translation requests as a giant string for translation; and parsing the translated string to replace a source language with a target language.

13. The method of claim 12, wherein if the size of the one or more translation requests exceeds the pre-defined threshold, the method comprising:

sending the one or more translation requests through the queue.

14. The method of claim 12, comprising:

identifying a target language and number of bytes per translation for at least one of the one or more translation requests.

15. A non-transitory computer readable storage medium storing program instructions stored thereon that, when executed by at least one processor of a system for prioritizing one or more translation requests, cause the at least one processor to perform the steps of:

receiving the one or more translation requests;

extracting one or more attributes associated with the one or more translation requests;

assigning a weight to each attribute of the one or more translation requests based on a relative importance of the each attribute with the one or more translation requests for controlling transmission of the one or more translation requests, wherein the one or more attributes associated with the one or more translation requests include at least one of: contextual information, frequency, size and language configuration of the one or more translation requests;

calculating a weighted score for the one or more translation requests based on the assigned weight to each attribute of the one or more attributes;

ranking the one or more translation requests based on the weighted score;

determining, based on the size of each of the one or more translation requests, whether to transmit a translation request as a single translation request when the size is below a pre-defined threshold; and transmitting the one or more translation requests based on the rank for translation.

16. The non-transitory computer-readable storage medium of claim 15, wherein the program instructions, when executed by the at least one processor, cause the at least one processor to perform the steps of:

extracting the contextual information for each translation request of the one or more translation requests, wherein the contextual information includes one or more of: a purpose, a category and an urgency of the translation requests.

17. The non-transitory computer-readable storage medium of claim 15, wherein the program instructions, when executed by the at least one processor, cause the at least one processor to perform the steps of:

determining the frequency of the one or more translation requests;

calculating a load factor based on the frequency of the one or more translation requests.

18. The non-transitory computer-readable storage medium of claim 15, wherein the program instructions, when executed by the at least one processor, cause the at least one processor to perform the steps of:

identifying a target language and number of bytes per translation for at least one of the one or more translation requests.

* * * * *